(12) United States Patent
Chen et al.

(10) Patent No.: US 7,496,685 B2
(45) Date of Patent: Feb. 24, 2009

(54) METHOD AND SYSTEM FOR MANAGING A DEVICE WITHIN A PRIVATE NETWORK USING A MANAGEMENT DEVICE EXTERNAL TO THE PRIVATE NETWORK

(75) Inventors: Weiwen Chen, Fort Collins, CO (US); Srikanth Natarajan, Fort Collins, CO (US); Pete Zwetkof, Greeley, CO (US); Tyler Peterson, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 744 days.

(21) Appl. No.: 10/376,252

(22) Filed: Mar. 3, 2003

(65) Prior Publication Data

US 2004/0177136 A1 Sep. 9, 2004

(51) Int. Cl.
*G06F 15/16* (2006.01)
(52) U.S. Cl. .................. 709/245; 709/203; 709/223
(58) Field of Classification Search .............. 709/203, 709/223, 224, 225, 245
See application file for complete search history.

(56) References Cited

U.S. PATENT DOCUMENTS

| | | | |
|---|---|---|---|
| 6,175,867 B1 * | 1/2001 | Taghadoss | ........... 709/223 |
| 6,581,108 B1 | 6/2003 | Denison et al. | |
| 6,639,893 B1 * | 10/2003 | Chikenji et al. | ........... 370/217 |
| 6,725,264 B1 | 4/2004 | Christy | |
| 6,981,036 B1 * | 12/2005 | Hamada | ........... 709/223 |
| 7,099,912 B2 * | 8/2006 | Ishizaki et al. | ........... 709/201 |

FOREIGN PATENT DOCUMENTS

EP 1 251 657 A2 10/2002

OTHER PUBLICATIONS

Fuller, V., Li, T., Yu, J., and K. Varadhan, "Classless Inter-Domain Routing (CIDR): an Address Assignment and Aggregation Strategy", RFC 1519, Sep. 1993.
Rekhter, Y., Moskowitz, B., Karrenberg, D., de Groot, G. J., and Lear, E., "Address Allocation for Private Internets", RFC 1918, Feb. 1996.
Egevang, K., and Francis, P., "The IP Network Address Translator (NAT)", RFC 1631, May 1994.

* cited by examiner

*Primary Examiner*—Ario Etienne
*Assistant Examiner*—El Hadji M Sall

(57) ABSTRACT

A method and system are described for managing a device within a private network using a management device external to the private network. According to exemplary embodiments, a first network address, used to uniquely identify the device within the private network, is associated with a second network address used to uniquely identify the device externally of the private network. An information exchange path is established between the device and the management device. Management of the device is provided via use of the first network address at the management device.

29 Claims, 3 Drawing Sheets

METHOD AND SYSTEM FOR MANAGING A DEVICE WITHIN A PRIVATE NETWORK USING A MANAGEMENT DEVICE EXTERNAL TO THE PRIVATE NETWORK

BACKGROUND

There is a maximum number of networks and hosts that can be assigned unique Internet Protocol (IP) addresses using the Internet's 32-bit addressing scheme. Internet IP addresses can be assigned in "classes", with Class A, Class B and Class C being commonly assigned classes. Each class address has two parts: a first part to identify a unique network, and a second part to identify a unique host within that network. Class A addresses support the largest number of hosts, while Class C addresses support the smallest number of hosts. Class addresses are assigned based on the number of host addresses required, but because of the coarseness of three-class system, a large number assigned host addresses can be unused.

A revised method of IP address assignment called Classless Inter-Domain Routing (CIDR) subsequently emerged. A CIDR address includes a 32-bit IP address, along with an additional descriptor that defines the number of bits of the IP address used to identify a particular network. The number of bits used in the network identifier part can vary anywhere from thirteen to twenty-seven bits, thus allowing more flexibility in the assigning of host addresses over the original class system. Nevertheless, the demand for IP addresses continued to outpace the number of assignable IP addresses. CIDR is described in detail in Fuller, V., Li, T., Yu, J., and K. Varadhan, "Classless Inter-Domain Routing (CIDR): an Address Assignment and Aggregation Strategy", RFC 1519, September 1993.

As a result, the concept of a private address space was introduced. The Internet Assigned Numbers Authority (IANA) reserved three blocks of IP addresses for use by "private" networks. The private addresses have no global meaning. That is, routers in networks not using private address space, especially those of Internet Service Providers (ISPs), are expected to be configured to reject (or filter out) routing information about private network addresses. The address space can thus be used (and reused) by many enterprises, making the IP addresses within the private address space only unique within a given enterprise. Private address space is described in Rekhter, Y., Moskowitz, B., Karrenberg, D., de Groot, G. J., and Lear, E., "Address Allocation for Private Internets", RFC 1918, February 1996.

The use of private network address space in managed enterprise networks presents challenges in the task of network management. First, a managed network spanning multiple private networks using private network address space can result in the same IP address being assigned to multiple network devices. This can lead to uncertainty in determining the source of network events and ambiguity in the display of devices in network topology maps. In addition, because the routers in networks not using private address space are expected to be configured to reject routing information about private network addresses, network management devices external to a private network cannot directly poll and collect data from operating within the private network.

SUMMARY

A method is disclosed for managing a device within a private network using a management device external to the private network. According to exemplary embodiments, a first network address, used to uniquely identify the device within the private network, is associated with a second network address used to uniquely identify the device externally of the private network. An information exchange path is established between the device and the management device. Management of the device is provided for via use of the first network address at the management device.

According to another exemplary embodiment, a system is provided including logic configured to associate a first network address, used to uniquely identify the device within the private network, with a second network address used to uniquely identify the device externally of the private network. An information exchange path is configured to exchange information between the device and the management device. Logic is also configured to provide for management of the device via use of the first network address at the management device.

An exemplary system for managing a device within a private network using a management device external to the private network, comprises: means for associating a first network address, used to uniquely identify the device within the private network, with a second network address used to uniquely identify the device externally of the private network; means for establishing an information exchange path between the device and the management device; and means for providing for management of the device via use of the first network address at the management device.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements and.

DETAILED DESCRIPTION OF THE PREFERRED EMBODIMENTS

Figure 1:
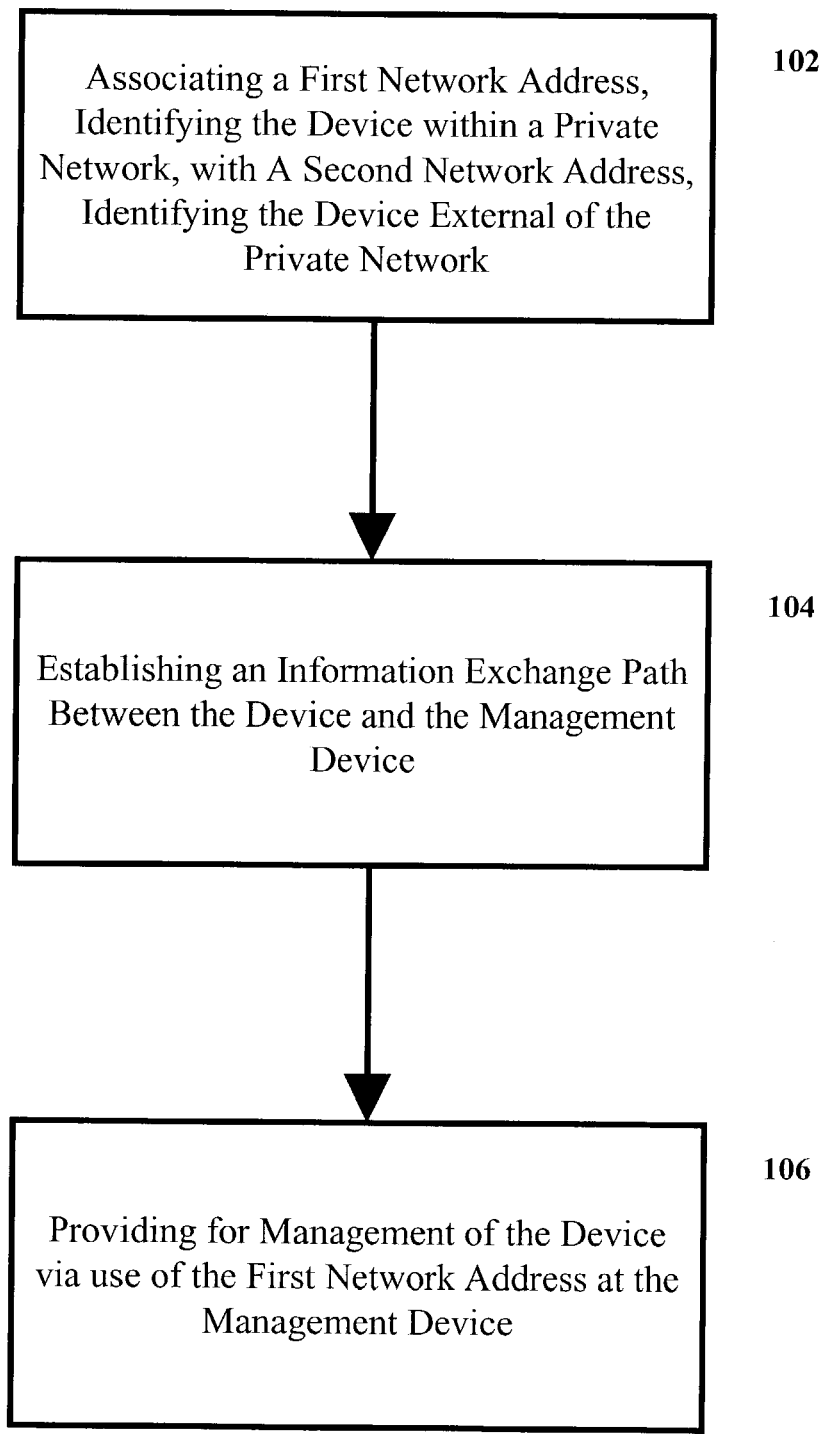
FIG. 1 is a flowchart illustrating a method for managing a device within a private network using a management device external to the private network.

FIG. 1 is a flowchart of a method for managing a device within a private network using a management device external to the private network. As used herein, a "private network" can include any portion of a managed network in which device addresses can be duplicated with addresses assigned in other portions of the managed network. For example, a private network can include a network that uses the three blocks of private address space described in RFC 1918. The reserved blocks include the IP addresses:

10.0.0.0-10.255.255.255;
172.16.0.0-172.31.255.255; and
192.168.0.0-192.168.255.255.

Figure 2:
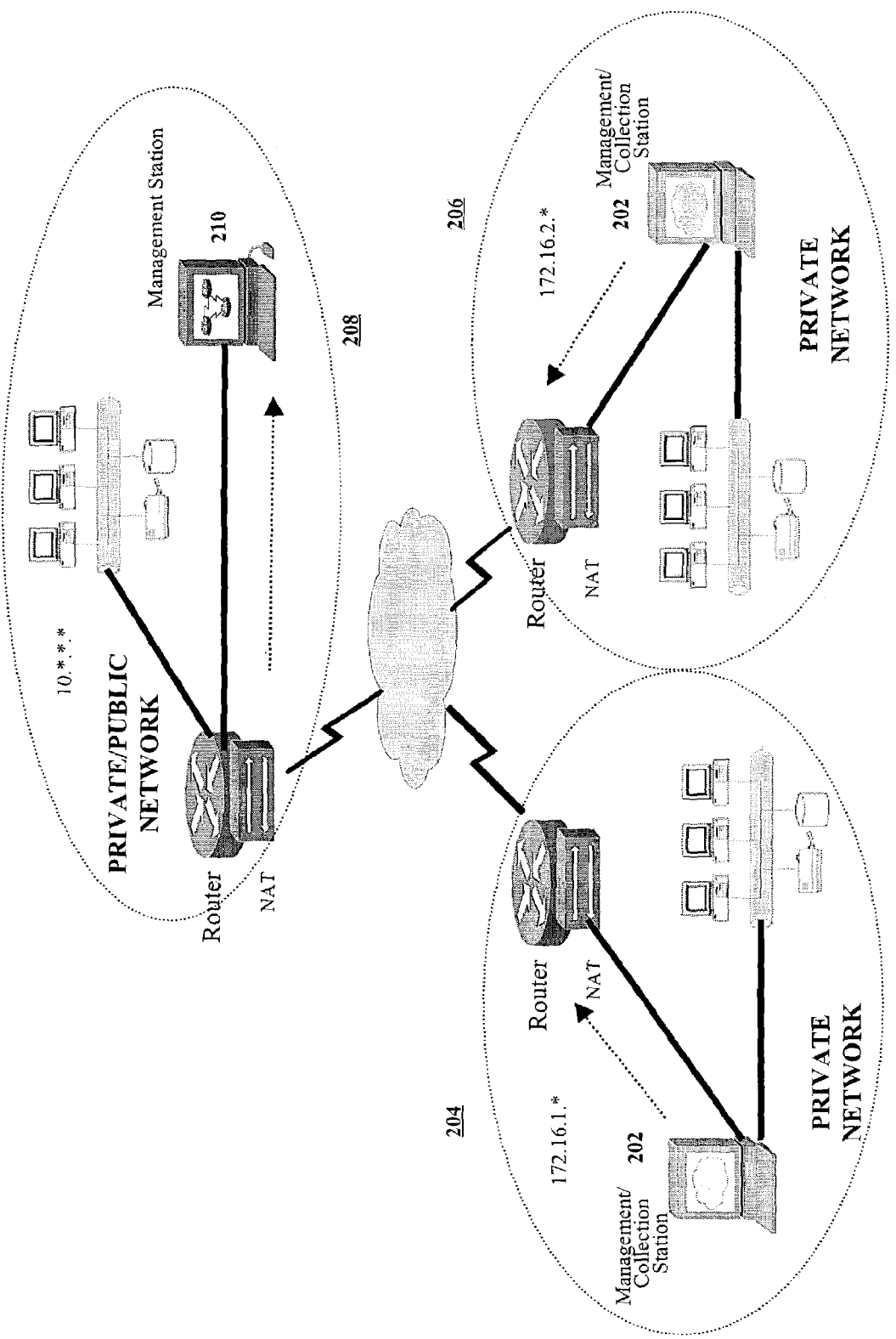
FIG. 2 depicts a distributed arrangement for managing a device within a private network.

Distributed arrangements such as that shown in FIG. 2 can be used to address network management challenges. FIG. 2 shows a managed network having three network domains 204/206/208. Management/collection stations (CS) 202 are deployed in the private networks 204/206 to collect event information and to poll and collect data from devices operating within the respective private networks. The CS 202 exchange network management information with a centralized management device (commonly referred to as a management station, or MS) 210 in another private (or public) network domain 208. The distributed arrangement shown in FIG. 2 uses a CS 202 deployed in every private network of a managed network that includes a network device to be managed.

Figure 3:
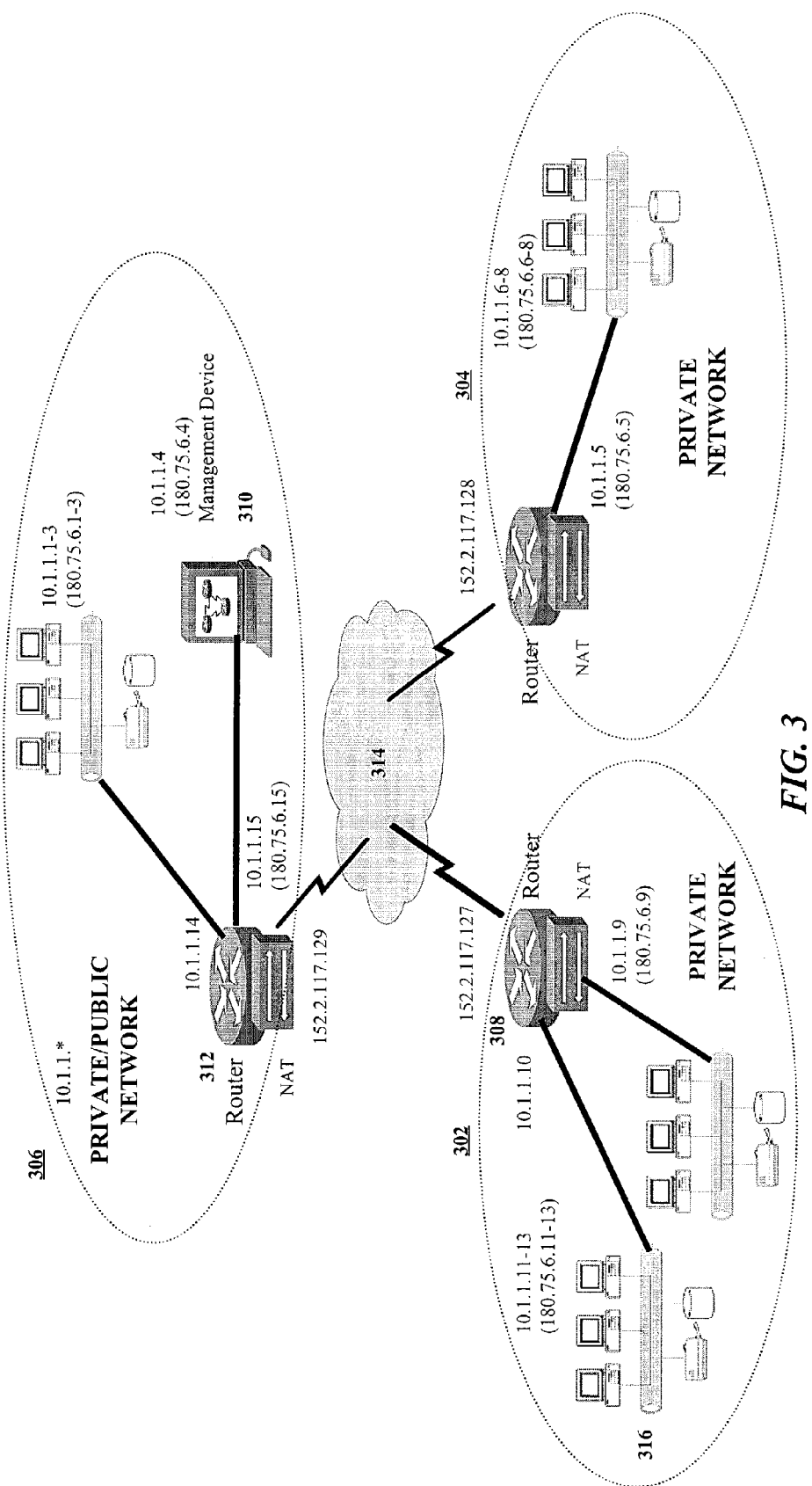
FIG. 3 depicts an arrangement for managing a device within a private network using a management device external to the private network according to an exemplary embodiment.

FIG. 3 shows an exemplary centrally managed network that spans three private networks 302/304/306, each private network using private address space according to RFC 1918. Each of the private network portions 302/304/306 uses addresses within the private address space block 10.0.0.0-10.255.255.255, although any IP address with the private address space can be used. A private network can also include the overlapping address space of a network that combines Class A, B, C addressing with a CIDR addressing scheme.

In step 102, a first network address, used to uniquely identify the device within the private network, is associated with a second network address used to uniquely identify the device externally of the private network. Referring to the router 308 in the first private network 302, a first network address (10.1.1.9) from the private address space can be assigned to an interface (e.g., a device) of the router 308. This first network address uniquely identifies the interface within the private network 302. That is, no other devices (or interfaces) are assigned this address with the private network portion 302. In the example, the assigned address is within one of the private address space blocks specified in RFC 1918. Consequently, no route to the interface exists externally of the private network 302.

According to step 102, the first network address is associated with a second network address (180.75.6.9). The second network address uniquely identifies the interface externally of the private network 302. Again, "uniquely" in this context means that no other device external of the private network portion 302 is assigned this second network address. The second network address can be a globally unique IP address assigned by IANA. Consequently, information can be routed to the interface from devices external of the private network 302 using the second network address.

At step 104, an information exchange path between the device and the management device is established. In the exemplary arrangement shown in FIG. 3, an information exchange path between a centralized management device 310, included in the private network portion 306, and the device 308 includes a router 312 and an IP network 314. The IP network 314 can be the Internet. The router 312 can be assigned a globally unique IP address (152.2.117.129). Although the management device 310 is shown in FIG. 3 as included in a private network portion 306 of the managed network (e.g., having the assigned private IP address 10.1.1.4), the concepts described herein can be equally applied to a centralized management device operating in a publicly addressable portion of the managed network.

In step 106, management of the device is provided for via use of the first network address at the management device. As used herein, the "management" of a device can include fault and problem management in which problems, or faults, in a network are detected, isolated, and controlled. This can be carried out by network status monitoring, alarms, alerts, reporting, and predictive tools. Management can also include performance management which measures the performance of network hardware, software, and media, such as throughput rate, percentage utilization, error rates, and response time, through the collection and analysis of data about the network. Management can also include configuration and change management which includes the finding and setting up of the network devices that control the behavior of the network, and the centralized control of configurations. Management can also include accounting management which obtains statistical information on network use by collecting and processing data related to resource consumption on the network, tracking each individual and a group's utilization of resources, and controlling access to the network for individuals and groups. Management can also include security management which protects the network and its interconnections, systems, and network management information from unauthorized access, unauthorized use, and other harm. Hewlett Packard's Network Node Manager (NNM) is an example of a software program product that can provide for the management of a device.

According to step 106, the tasks associated with the management of the device 308 are provided at the management device 310 via the first network address, e.g., 10.1.1.9. That is, problems or faults associated with the device are identified at the management device (e.g., using topology maps) using the device's first (or private) network address. Moreover, the polling of device information, the tracking of resource usage by the device, and the monitoring of device security information all are carried out at the management device 310 using the device's first (or private) network address. If a name-serving device, having software such as Domain Name System (DNS), is configured to map the first network address to a meaningful hostname, then management of the device can be provided via the hostname.

According to exemplary embodiments, the first network address of the device can be acquired at the management device from which the second network address associated with the first network address can be determined. Recall that management of the device 308 is provided for at the management device 310 via the first network address (10.1.1.9). But the first network address is a private address as defined in RFC 1918, and cannot be used to route a message directly from the management device 310 to the device 308. Instead, the management device 310 can use the second network address (180.75.6.9), associated with the first network address, to uniquely identify the device 308 external of the private network 302. The second network address associated with the first network address can be determined by referencing a table stored in memory. Information in the table can be organized as shown in Table 1 that shows a portion of an exemplary mapping configuration file.

TABLE 1

Exemplary Mapping Configuration File

| Public (Second) Network Address | Private (First) Network Address |
|---|---|
| 180.75.6.4 | 10.1.1.4 |
| 180.75.6.* | 10.1.1.* |
| 180.75.6.1-50 | 10.1.1.1-50 |

The exemplary mapping configuration file shown in Table 1 depicts shorthand notations that can be used to describe the associated first and second network addresses. For example, the first entry explicitly associates the public IP address 180.75.6.4 with the private network address 10.1.1.4. The second entry associates all hosts (0-255) having a public network ID of 180.75.6 with respective hosts (0-255) having a private network ID of 10.1.1. Finally, the third entry associates hosts 1-50 having the public network ID of 180.75.6 with hosts 1-50 having the private network ID of 10.1.1, respectively. Explicit associations included in the mapping configuration file can take precedence over associations using "wildcard" ("*", "-", etc.) notation.

A message can be sent from the management device 310 including management information and the second network address to identify the device as a destination of the message. For example, the second network address can be included as the destination address in an IP header portion of an IP packet used to carry at least a portion of the message from the management device 310 to the device 308. The management information included in the message can be related to any of the management functions described above, including information to poll and collect performance data from the device. The management information can be included in a payload portion of an IP packet. The message can be sent according to established protocols including Internet Control Message Protocol (ICMP) and Simple Network Management Protocol (SNMP).

The management device 310 can be configured to receive a message from the device 308 including device information and the second network address to identify the device as a source of the message. The second network address can be included as the source address in the IP header portion of an IP packet used to carry at least a portion of the message from the device 308 to the management device 310. The management information included in the message can be related to any of the management functions described above, including information describing a problem or fault (referred to as an event) associated with the device 308. The management information can again be included in the payload portion of an IP packet. The message can be sent according to established protocols, including SNMP.

Certain messages sent from a managed device to a management device including event information are referred to as traps. When these types of messages are sent in accordance with SNMP, the messages can be referred to as SNMP traps. An SNMP agent is configured on each of the managed devices to generate the traps, and to forward the trap messages to the management device 310. Two versions of SNMP (v1 and v2C) are commonly used to generate trap messages. Traps sent in accordance with SNMPv1 include the identity of the sending device 308 in the payload portion of the message as an agent-address record. When an SNMPv1 trap is generated by an agent operating on the device 308 in the private network 302, the payload will include the agent-address record corresponding to device's private (or first) network address. Accordingly, the first network address can be extracted directly from the payload portion of the trap along with the device information (e.g., event information). The device information can then be associated with the device using the first network address. For example, the device 308 can be displayed on a topology map at the management device 310, together with the first network address (10.1.1.9) to identify the device 308 on the map.

Traps sent in accordance with SNMPv2C do not include an agent-address record identifying the sending device 308 in the payload portion of the message. This also applies traps sent by SNMPv1 agents operating on Windows NT-based systems. The Windows NT operating system converts all SNMP traps into an SNMPv2C format. While the device information (e.g., event information) can again be extracted from the payload portion of such traps messages, the first network address cannot be obtained directly from the payload portion as with SNMPv1 generated traps.

Instead, the second network address (180.75.6.9) can be extracted from the IP header portion of the SNMPv2C trap message at the management device 310. The first network address (10.1.1.9) associated with the second network address (180.75.6.9) can then be determined at the management device 310. This determination can be made by again referring to the mapping configuration file illustrated in Table 1. The extracted device information can then be associated with the device using the first network address, e.g., by displaying the device 308 on a topology map at the management device 310, together with the first network address (10.1.1.9).

The information exchange path between the device 308 and the management device 310 can be established by providing a routing device configured to route a message between the device 308 and the management device 310. In the exemplary arrangement shown in FIG. 3, the device 308 is such a routing device. The first network address, included in the message to identify the device as a source of the message, can be translated to the second network address when routing the message from the device to the management device. Similarly, the second network address, included in the message to identify the device as a destination of the message, can be translated to the first network address when routing the message from the management device to the device. The routing device is preferably a device 308 arranged within the private network 302 at the boundary between the private and public address space. The routing device can however be physically arranged outside the private network 302 and connected to devices within the private network 302 using firewalls and other suitable security arrangements.

The information exchange path between the device and the management device can include an IP-based network 314, e.g., the Internet. In such arrangements, the first and second network addresses included in the message to identify the device 308 as either the source or destination of the message can be included in the IP header portion of an IP packet used to carry at least a portion of the message between the device 308 and the management device 310.

The routing device can be configured to translate the first and second network addresses. For example, the routing device can be configured to perform static IP Network Address Translation (NAT) for translating the first and second network addresses. NAT is designed to conserve IP address space and to enhance security for private networks. With static NAT, bindings between public and private addresses are fixed and do not vary between sessions, in contrast to dynamic NAT, in which bindings between public and private addresses can change between sessions. Using static NAT can be important if a device outside a private routing domain needs to initiate connection to a device operating inside the private routing domain, e.g., in a network management environment. NAT is described in detail in Egevang, K., and Francis, P., "The IP Network Address Translator (NAT)", RFC 1631, May 1994, the entire contents of which are incorporated herein by reference.

NAT provides for the translation of IP header information by substituting public addresses for private addresses in IP packets that need to transit the public network. NAT accomplishes this by providing a public to private address mapping.

In arrangements using NAT for address translation at the routing device, the same mapping file used to support NAT functionality can be used by the management device 310 to determine associations between private (e.g., the first network address) and public (e.g., the second network address) addresses. If multiple routing devices 308 in the private network 302 are configured with NAT, each of the routing devices should use a common address mapping file. An arrangement in which NAT is automatically performed in the routing device 308 and associations between the first and second network addresses are automatically determined in the management device 310 enables management of the device 308 via the first network address notwithstanding the first network address being a private network address. Accordingly, a customer (e.g., an ISP) need never know a device's NAT'ed (public) address as only the private address can be used to refer to the device within managed environment.

According to exemplary embodiments, an interface included in the device but not associated with the first network address can be managed. For example, in the exemplary arrangement shown in FIG. 3, the device 308 includes a second interface having a private IP address (10.1.1.10) different from the first network address (10.1.1.9). There need not be a public IP address associated with the private IP address of the second interface for the interface to be managed by the management device 310. To manage the interface, SNMP messages can be exchanged between the second interface and the management device via a NAT'ed interface, e.g., the interface shown in the figure having the private IP address 10.1.1.9 and the public IP address 180.75.6.9.

Information describing the available interfaces can be obtained by examining the device's Management Information Base (MIB) via the NAT'ed interface. Devices 316 connected to a non-NAT'ed interface can be managed if appropriate entries (e.g., associating the IP addresses 10.1.1.1 1-13 with 180.75.6.11-13) are made in both the NAT address mapping file, used by the routing device 308, and the mapping configuration device used by the management device 310.

The management device 310 can be included within a second private network. FIG. 3 shows the management device 310 physically located within a second private network 306. A third network address (10.1.1.4), used to uniquely identify the management device 310 within the second private network 306, can be associated with a fourth network address (180.75.6.4) used to uniquely identify the management device externally of the second private network and the private network including the device.

When included within a second private network, the information exchange path between the device 308 and the management device 310 can include a second router 312 configured to perform address translation using NAT. SNMP agents operating on devices in other private network portions of the managed network (e.g., devices 316) can be configured to use the fourth network address as the destination address for SNMP trap messages. The destination address can then be translated by the router 312 using NAT, and forwarded to the management device 310 for processing. It will be understood that the management device 310 can be physically arranged within the public address space, wherein traps can be address directly to the management device 310, thus eliminating the need for address translation via NAT Various aspects of the invention will now be described in connection with exemplary embodiments. To facilitate an understanding of these embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both. Moreover, the exemplary embodiments can be considered part of any form of computer readable storage medium having stored therein an appropriate set of computer instructions that would cause a processor to carry out the techniques described herein.

Thus, the various aspects can be embodied in many different forms, and all such forms are contemplated to be within the scope of what is described. For each of the various aspects, any such form of embodiment can be referred to herein as "logic configured to" perform a described action, or alternatively as "logic that" performs a described action.

A system for managing a device within a private network using a management device external to the private network according to an exemplary embodiment is shown in FIG. 3. The system includes logic configured to associate a first network address, used to uniquely identify the device within the private network, with a second network address used to uniquely identify the device externally of the private network. The system further includes an information exchange path configured to exchange information between the device and the management device. Logic is configured to provide for management of the device via use of the first network address at the management device. The phrase "private network" and the terms "uniquely" and "management" have meanings consistent with those described in conjunction with the exemplary method illustrated in FIG. 1.

In addition to including logic configured to perform the various tasks described above, the system can also include an SNMP arranged in the management device 310, configured to send and receive SNMP information over the information exchange path. An application program interface (API) can be configured to interface with the SNMP agent at the management device 310. The second network address can be used to identify the device 308 as a source of the SNMP information (e.g., in the IP header portion of an IP packet used to carry at least a portion of an SNMP trap message). The API can include logic configured to determine the first network address associated with the second network address when SNMP information is received at the management device. Logic can also be configured to determine the second network address associated with the first network address when SNMP information is sent from the management device, in which case the second network address can be used to identify the device 308 as a destination of the SNMP information. The API can reference a mapping configuration file as shown in Table 1 to determine the address associations. Again, the mapping configuration file can be substantially similar to the address mapping file used by NAT.

A singleton class can be defined at the management device 310 to determine the first network address that is associated with the second network address, and vice versa. The following is an exemplary class definition for use with Hewlett Packard's NNM program product in their OpenView environment for managing devices in private networks via NAT.

```
class OVNat {
    public:
        // Get the NAT instance
        static OVNat *instance(const string filename="");
        // Get the private IP from public IP
        in_addr_t getPrivateIP(const in_addr_t publicIP) const;
        // Get the private IP from public IP
        in_addr_t getPrivateIP(const string publicIP) const;
        // Get the public IP from private IP
        in_addr_t getPublicIP(const in_addr_t privateIP) const;
        // Get the public IP from private IP
        in_addr_t getPublicIP(const string privateIP) const;
        // Convert an integer IP address into a string
        static string str(const in_addr_t ip);
        // Is this network configured with NAT?
        bool hasNat( ) const;
        // Writes all private IP address from the mapping file
        void getSeeds(ostream * const) const;
        // Load all NAT'ed devices directly into management DB
        void loadHosts( ) const;
```

-continued

```
protected:
    OVNat(const string filename="");
    // Initialize the NAT from a mapping file
    void __init(const string filename);
    virtual ~OVNat( );
private:
    // Copy
    OVNat(const OVNat &rhs);
    // Assign
    OVNat &operator=(const OVNat &rhs);
    // Instance
    static OVNat *__instance;
    // Mapping table
    // This is to store the Public IP to Private IP mapping
    map<in__addr_t, in__addr_t> *__out__in;
    // Store the Private IP to Public IP mapping
    map<in__addr_t, in__addr_t> *__in__out;
    // Flag to indicate initialized or not
    static bool __initialized;
};
```

The steps of a computer program as illustrated in FIG. 1 for managing a device within a private network using a management device external to the private network can be embodied in any computer readable medium for use by or in connection with an instruction execution system, apparatus, or device, such as a computer based system, processor containing system, or other system that can fetch the instructions from the instruction execution system, apparatus, or device and execute the instructions.

As used herein, a "computer readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non exhaustive list) of the computer readable medium can include the following: an electrical connection having one or more wires, a portable computer diskette, a random access memory (RAM), a read only memory (ROM), an erasable programmable read only memory (EPROM or Flash memory), an optical fiber, and a portable compact disc read only memory (CDROM).

It will be appreciated by those of ordinary skill in the art that the present invention can be embodied in various specific forms without departing from the spirit or essential characteristics thereof. The presently disclosed embodiments are considered in all respects to be illustrative and not restrictive. The scope of the invention is indicated by the appended claims, rather than the foregoing description, and all changes that come within the meaning and range of equivalence thereof are intended to be embraced.

What is claimed is:

1. A method for managing a device within a private network using a management device external to the private network, the method comprising:
   receiving a message at the management device including device information, a first network address, and a second network address to identify the device as a source of the message;
   extracting the first network address and the device information from the received message;
   associating the device information with the device using the first network address;
   associating the first network address, used to uniquely identify the device within the private network, with the second network address used to uniquely identify the device externally of the private network;
   associating a third network address, used to uniquely identify the management device within a second private network, with a fourth network address used to uniquely identify the management device externally of the second private network and the private network including the device;
   establishing an information exchange path between the device and the management device; and
   providing for management of the device via use of the first network address at the management device, wherein the management device is included within the second private network, and wherein problems or faults associated with the device are identified at the management device using the first network address of the device.

2. The method of claim 1, comprising:
   acquiring the first network address of the device at the management device;
   determining the second network address associated with the first network address; and
   sending a message from the management device including management information and the second network address to identify the device as a destination of the message.

3. The method of claim 1, comprising:
   receiving a message at the management device including device information and the second network address to identify the device as a source of the message;
   extracting the second network address and the device information from the received message;
   determining the first network address associated with the second network address; and
   associating the device information with the device using the first network address.

4. The method of claim 1, wherein the establishing comprises:
   providing a routing device configured to route a message between the device and the management device;
   translating the first network address, included in the message to identify the device as a source of the message, to the second network address when routing the message from the device to the management device; and
   translating the second network address, included in the message to identify the device as a destination of the message, to the first network address when routing the message from the management device to the device.

5. The method of claim 4, wherein the information exchange path between the device and the management device includes an Internet Protocol based (IP-based) network, and the routing device is capable of performing static IP Network Address Translation (NAT) for translating the first and second network addresses.

6. The method of claim 1, comprising:
   presenting information associated with the device at the management device using the first network address to identify the device.

7. The method of claim 1, comprising:
   providing for management of an interface, included in the device, not associated with the first network address.

8. A system for managing a device within a private network using a management device external to the private network, the system having a processor to execute instructions comprising:
   logic configured to receive a message at the management device including device information, a first network address, and a second network address to identify the device as a source of the message;

logic configured to extract the first network address and the device information from the received message;

logic configured to associate the device information with the device using the first network address;

logic configured to associate the first network address, used to uniquely identify the device within the private network, with the second network address used to uniquely identify the device externally of the private network;

logic configured to associate a third network address, used to uniquely identify the management device within a second private network, with a fourth network address used to uniquely identify the management device externally of the second private network and the private network including the device, wherein an information exchange path is configured to exchange information between the device and the management device; and logic configured to provide for management of the device via use of the first network address at the management device, wherein the management device is included within the second private network, and wherein problems or faults associated with the device are identified at the management device using the first network address of the device.

9. The system of claim 8, comprising:

logic configured to acquire the first network address of the device at the management device;

logic configured to determine the second network address associated with the first network address; and logic configured to send a message from the management device including management information and the second network address to identify the device as a destination of the message.

10. The system of claim 8, comprising:

logic configured to receive a message at the management device including device information and the second network address to identify the device as a source of the message;

logic configured to extracting the second network address and the device information from the received message;

logic configured to determine the first network address associated with the second network address; and logic configured to associate the device information with the device using the first network address.

11. The system of claim 8, wherein the information exchange path comprises:

a routing device configured to route a message between the device and the management device;

logic configured to translate the first network address, included in the message to identify the device as a source of the message, to the second network address when routing the message from the device to the management device; and logic configured to translate the second network address, included in the message to identify the device as a destination of the message, to the first network address when routing the message from the management device to the device.

12. The system of claim 11, wherein the information exchange path between the device and the management device includes an Internet Protocol based (IP-based) network, and the routing device is configured to perform static IP Network Address Translation (NAT) for translating the first and second network addresses.

13. The system of claim 8, comprising:

a display, coupled to the management device, for presenting information associated with the device using the first network address to identify the device on the display.

14. The system of claim 8, comprising:

an interface, included in the device, not associated with the first network address; and logic configured to provide for management of the interface at the management device.

15. The system of claim 8, comprising:

a Simple Network Management Protocol (SNMP) agent included in the management device configured to send and receive SNMP information over the information exchange path; and an application program interface (API) configured to interface with the SNMP agent at the management device, the API including:

logic configured to determine the first network address associated with the second network address when SNMP information is received at the management device, the second network address used to identify the device as a source of the SNMP information; and logic configured to determine the second network address associated with the first network address when SNMP information is sent from the management device, the second network address used to identify the device as a destination of the SNMP information.

16. A computer readable storage medium storing a computer program for managing a device within a private network using a management device external to the private network, wherein the computer program performs the steps of:

receiving a message at the management device including device information, a first network address, and a second network address to identify the device as a source of the message;

extracting the first network address and the device information from the received message;

associating the device information with the device using the first network address;

associating the first network address, used to uniquely identify the device within the private network, with the second network address used to uniquely identify the device externally of the private network;

associating a third network address, used to uniquely identify the management device within a second private network, with a fourth network address used to uniquely identify the management device externally of the second private network and the private network including the device;

establishing an information exchange path between the device and the management device; and providing for management of the device via use of the first network address at the management device, wherein the management device is included within the second private network, and wherein problems or faults associated with the device are identified at the management device using the first network address of the device.

17. A computer readable medium of claim 16, wherein the computer program performs the steps of:

acquiring the first network address of the device at the management device;

determining the second network address associated with the first network address; and sending a message from the management device including management information and the second network address to identify the device as a destination of the message.

18. A computer readable medium of claim 16, wherein the computer program performs the steps of:
receiving a message at the management device including device information and the second network address to identify the device as a source of the message;
extracting the second network address and the device information from the received message;
determining the first network address associated with the second network address; and
associating the device information with the device using the first network address.

19. A computer readable medium of claim 16, wherein the establishing comprises:
providing a routing device configured to route a message between the device and the management device;
translating the first network address, included in the message to identify the device as a source of the message, to the second network address when routing the message from the device to the management device; and
translating the second network address, included in the message to identify the device as a destination of the message, to the first network address when routing the message from the management device to the device.

20. A computer readable medium of claim 19, wherein the information exchange path between the device and the management device includes an Internet Protocol based (IP-based) network, and the routing device is capable of performing static IP Network Address Translation (NAT) for translating the first and second network addresses.

21. A computer readable medium of claim 16, wherein the computer program performs the step of:
presenting information associated with the device at the management device using the first network address to identify the device.

22. A computer readable medium of claim 16, wherein the computer program performs the step of:
providing for management of an interface, included in the device, not associated with the first network address.

23. A system for managing a device within a private network using a management device external to the private network, the system comprising:
means for receiving a message at the management device including device information, a first network address, and a second network address to identify the device as a source of the message;
means for extracting the first network address and the device information from the received message;
means for associating the device information with the device using the first network address;
means for associating the first network address, used to uniquely identify the device within the private network, with the second network address used to uniquely identify the device externally of the private network;
means for associating a third network address, used to uniquely identify the management device within a second private network, with a fourth network address used to uniquely identify the management device externally of the second private network and the private network including the device;
means for information exchange between the device and the management device; and
means for providing for management of the device via use of the first network address at the management device, wherein the management device is included within the second private network, and wherein problems or faults associated with the device are identified at the management device using the first network address of the device.

24. The system of claim 23, comprising:
means for acquiring the first network address of the device at the management device;
means for determining the second network address associated with the first network address; and
means for sending a message from the management device including management information and the second network address to identify the device as a destination of the message.

25. The system of claim 23, comprising:
means for receiving a message at the management device including device information and the second network address to identify the device as a source of the message;
means for extracting the second network address and the device information from the received message;
means for determining the first network address associated with the second network address; and
means for associating the device information with the device using the first network address.

26. The system of claim 23, comprising:
means for routing a message between the device and the management device;
means for translating the first network address, included in the message to identify the device as a source of the message, to the second network address when routing the message from the device to the management device; and
means for translating the second network address, included in the message to identify the device as a destination of the message, to the first network address when routing the message from the management device to the device.

27. The system of claim 26, wherein the information exchange means between the device and the management device includes an Internet Protocol based (IP-based) network, and the routing means is capable of performing static IP Network Address Translation (NAT) for translating the first and second network addresses.

28. The system of claim 23, comprising:
means for presenting information associated with the device at the management device using the first network address to identify the device.

29. The system of claim 23, comprising:
means for providing for management of an interface, included in the device, not associated with the first network address.

* * * * *